Mar. 6, 1923.
W. E. HALE.
BRAKE MECHANISM FOR WINDING DRUMS.
FILED FEB. 6, 1920.
1,447,778.
2 SHEETS—SHEET 2.
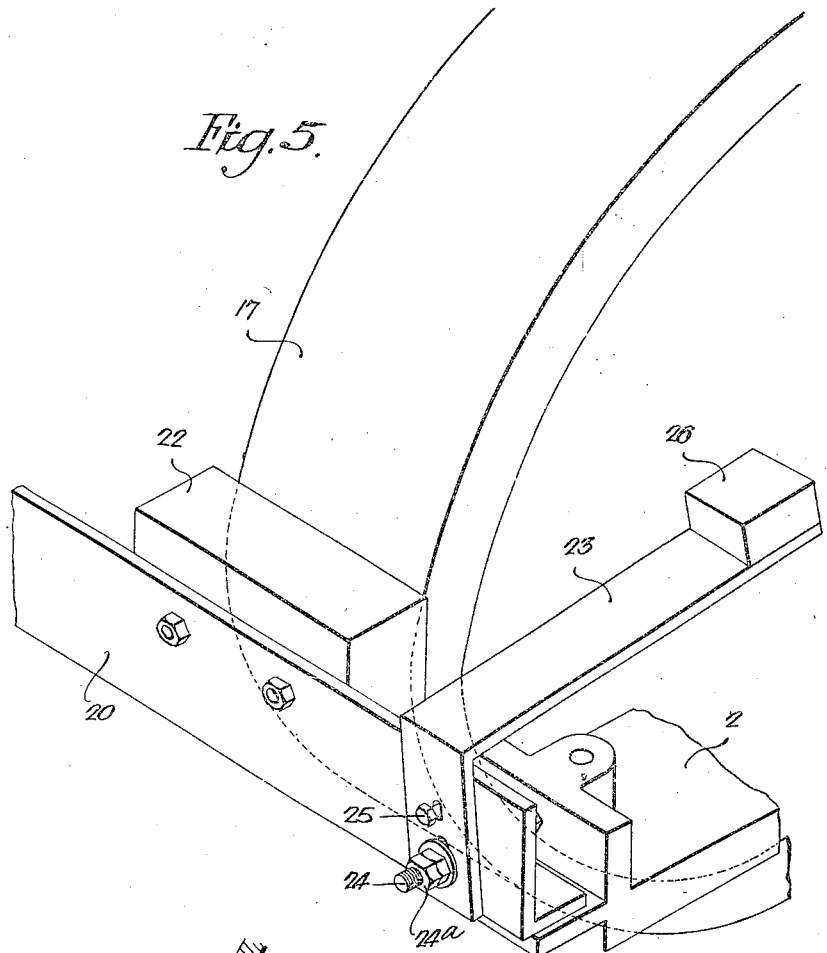
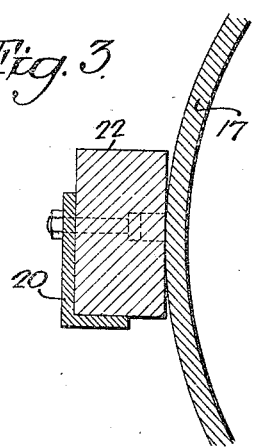
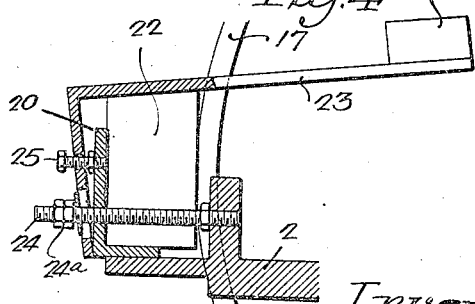
Inventor.
William E. Hale.
by his Attorneys
Howson & Howson Patented Mar. 6, 1923.

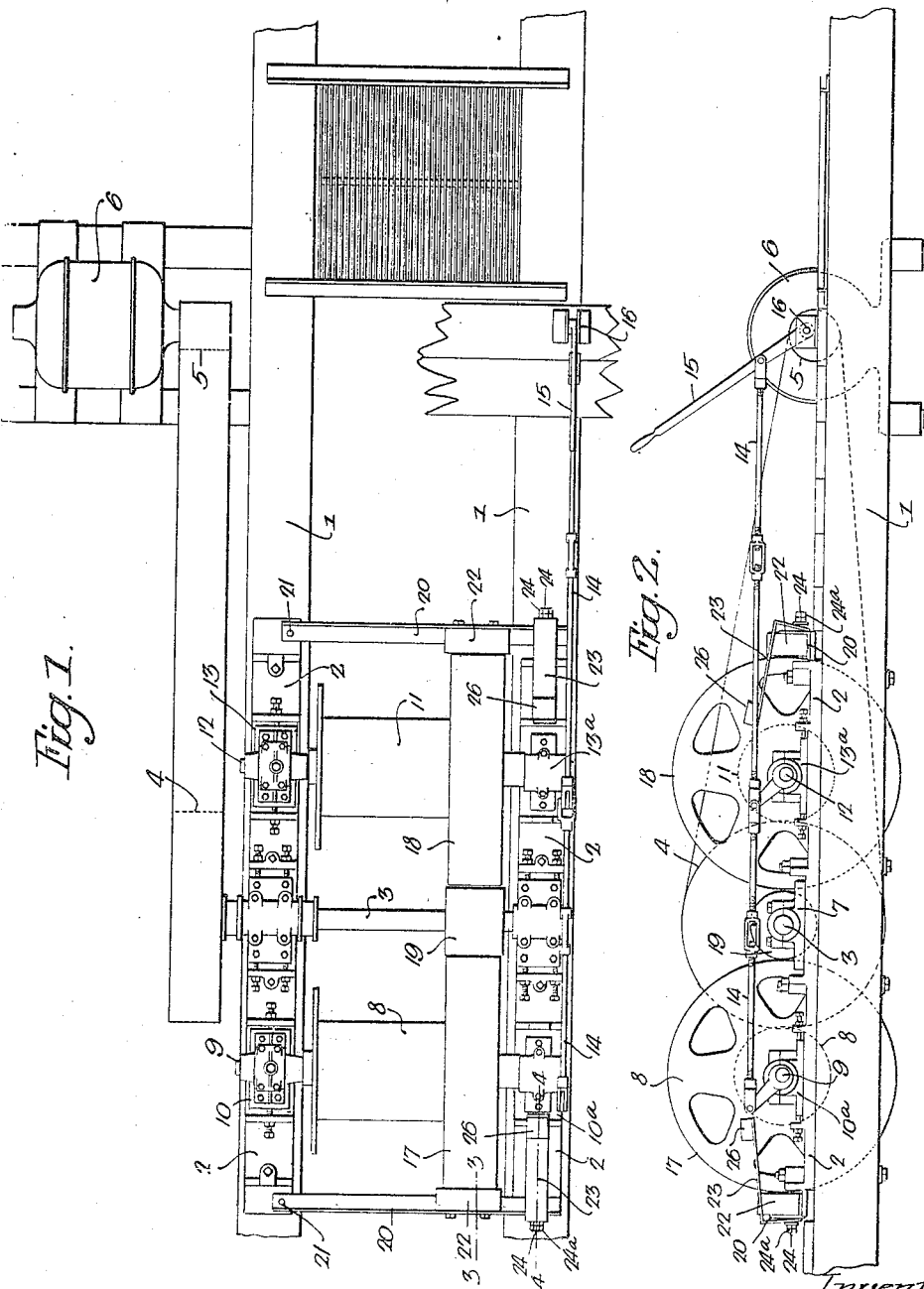

1,447,778

UNITED STATES PATENT OFFICE.

WILLIAM E. HALE, OF FORT WASHINGTON, PENNSYLVANIA, ASSIGNOR TO R. H. BEAUMONT COMPANY, OF PHILADELPHIA, PENNSYLVANIA, A CORPORATION OF PENNSYLVANIA.

BRAKE MECHANISM FOR WINDING DRUMS.

Application filed February 6, 1920. Serial No. 356,712.

*To all whom it may concern:*

Be it known that I, WILLIAM E. HALE, a citizen of the United States, residing in Fort Washington, Montgomery County, Pennsylvania, have invented certain Improvements in Brake Mechanism for Winding Drums, of which the following is a specification.

My invention relates to certain improvements in hoisting apparatus in which there is a central driving shaft; two hoisting drums, one on each side of the shaft; and a brake for each hoisting drum on the opposite side of the drums from the shaft. Means are provided for shifting the drums so that when one drum is in engagement with the driving mechanism the other drum is in engagement with the brake. The brakes are usually so placed that there is an interval of time between the release of the drum from the driving mechanism and the contact of the drum with the brake. In this interval the drum is free and the rope is liable to become slack, winding unevenly on the drum.

The main object of my invention is to keep the drums under control at all times. This object I attain by so arranging the brakes that they will rest upon the drums when power is applied, but the pressure will not be sufficient to interfere with the driving action of the power mechanism.

The invention also relates to certain details, which will be fully described hereinafter.

In the accompanying drawings:

Fig. 1 is a plan view of a hoisting apparatus illustrating my invention;

Fig. 2 is a side view;

Fig. 3 is an enlarged sectional view illustrating in detail the brake arm and block on the line 3—3, Fig. 1;

Fig. 4 is an enlarged sectional view on the line 4—4, Fig. 1; and

Fig. 5 is a perspective view illustrating a portion of the brake mechanism.

1, 1 are two longitudinal beams on which the base castings 2 are mounted. 3 is the driving shaft having a pulley 4, in the present instance, belted to the pulley 5 of an electric motor 6, but it will be understood that any suitable power may be used. The driving shaft 3 is mounted in bearings 7 on the base plate 2. On each side of the driving shaft 3 is a rope drum. The rope drum 8 is mounted on a shaft 9 adapted to bearings 10, 10$^a$, while the rope drum 11 is mounted on a shaft 12 adapted to bearings 13, 13$^a$. The bearings 10 and 13 are swivel bearings, while the bearings 10$^a$ and 13$^a$ are eccentric bearings and are adapted to be moved by a rod 14 connected to a lever 15, which is pivoted at 16. By this arrangement, the friction surfaces 17 and 18 of the drums 8 and 11 can be brought into positive contact with the friction wheel 19 of the shaft 3. When the lever mechanism is moved in one direction, one drum is in engagement with the driving shaft, while the other is thrown out of engagement with the shaft. On the opposite side of each drum is a brake mechanism, which consists of an arm 20 pivoted at 21 to the base plate 2, in the present instance. On each arm is a brake block 22. These blocks are adapted to bear upon the broad frictional surfaces 17 and 18 of the two drums. In order to hold the blocks 22 in frictional engagement with the drums at all times, I pivotally mount a lever 23 on a bolt 24, which is secured to the base 2, Fig. 4. On the arm 20 is a stud 25 having adjusting nuts. The lever extends between these nuts and has at its outer end a weight 26 so that the tendency of the weighted lever is to hold the brake block 22 against the frictional surfaces of the drum. The bolt 24 not only acts as a fulcrum for the lever 23, but is also provided with adjustable nuts 24$^a$, which determine the amount of movement of the brake arm so that, on setting these nuts, the brake arm can have a certain amount of movement before it is positively stopped, as full pressure is applied to it by the drum. This pressure is not sufficient to interfere with the driving of the drum by the power shaft, but it is sufficient to hold the drum from rotating freely when the drum is moved away from the power shaft and the brake is so set that as it continues the movement, due to the eccentric bearings, the brake will be applied with sufficient strength to stop the rotation of the drum and to hold it so that by this construction the two ropes on the drums are under control at all times.

While I have illustrated a certain type of brake mechanism, it will be understood that the construction may be modified without departing from the essential features of the invention.

My invention is especially adapted for use in connection with scraping apparatus used with means for piling coal, or removing coal from a pile, where one rope is slack while the other is under tension, but it will be understood that it can be used in any place where two drums are employed and in which one of the ropes is slack while the other is under tension.

I claim:

1. The combination in hoisting apparatus, of a driving shaft; a friction wheel thereon; two drums, one on each side of the driving shaft; shafts for each drum; means for mounting the shafts so that the drums can be moved into and out of contact with the wheel of the driving shaft; a pivotally mounted brake located on the opposite side of each drum from the driving shaft; and a weighted lever tending to hold the brake in frictional contact with the drum at all times, said brake bearing lightly on the drum when the drum is driven, and positively breaking the drum against continued rotation in the same direction when the drums are moved away from the wheel of the driving shaft.

2. The combination in a hoisting apparatus, of a driving shaft adapted to fixed bearings, said driving shaft having a friction wheel; two shafts, one on each side of the driving shaft, said shafts being mounted in eccentric bearings; a rope drum carried by each of said latter shafts, each drum having a friction surface in line with the friction wheel on the driving shaft; a pivoted brake for each drum mounted on the opposite side of the drum to the driving shaft, each brake having a block arranged in line with the friction surface of the drums; and lever mechanism for holding the brake blocks in contact at all times with the frictional surfaces of the drums, said brakes bearing lightly on the drums when the drums are driven and adapted to positively brake the drums against continued rotation in the same direction when the drums are moved away from the wheel on the driving shaft.

3. The combination in hoisting apparatus, of a driving shaft; a friction wheel thereon; two drum shafts, one mounted on each side of the driving shaft; bearings for the said drum shafts; means for shifting the bearings of the shafts so as to move the shafts towards and from the driving shaft; a drum on each drum shaft, each drum having a frictional surface adapted to bear upon the friction wheel of the driving shaft; a brake for each drum mounted on the opposite side of the drum from the driving shaft, each brake consisting of a pivoted arm having a brake block bearing against the frictional surface of the drum; a bolt secured to the frame; a lever pivotally mounted on the bolt and arranged to hold the brake block in yielding contact with the drum, the bolt acting as a stop to limit the movement of the brake arm when the drum is shifted to its full extent towards the brake.

WILLIAM E. HALE.